United States Patent
Poletti et al.

(10) Patent No.: US 9,025,447 B2
(45) Date of Patent: May 5, 2015

(54) SERVICE ADMISSION PATH CONTROL (SAPC)

(75) Inventors: Claude Poletti, Fontenay-aux-Roses (FR); Marc Cartigny, Chatou (FR)

(73) Assignee: Airbus Defence and Space SAS, Les Mureaux (FR)

( * ) Notice: Subject to any disclaimer, the term of this patent is extended or adjusted under 35 U.S.C. 154(b) by 99 days.

(21) Appl. No.: 13/575,383

(22) PCT Filed: Jan. 25, 2011

(86) PCT No.: PCT/EP2011/000293
§ 371 (c)(1),
(2), (4) Date: Sep. 11, 2012

(87) PCT Pub. No.: WO2011/091977
PCT Pub. Date: Aug. 4, 2011

(65) Prior Publication Data
US 2013/0223209 A1    Aug. 29, 2013

(30) Foreign Application Priority Data
Jan. 26, 2010  (EP) ..................... 10290039

(51) Int. Cl.
*H04L 12/70*  (2013.01)
*H04L 12/801*  (2013.01)
*H04L 12/54*  (2013.01)
*H04L 12/911*  (2013.01)
*H04L 12/927*  (2013.01)

(52) U.S. Cl.
CPC ............ *H04L 47/19* (2013.01); *H04L 12/5695* (2013.01); *H04L 47/74* (2013.01); *H04L 47/783* (2013.01); *H04L 47/801* (2013.01); *H04L 47/805* (2013.01); *H04L 47/822* (2013.01); *H04L 47/829* (2013.01)

(58) Field of Classification Search
CPC .......... H04L 47/10; H04L 47/20; H04L 47/19
USPC ........................................ 370/230, 232, 237
See application file for complete search history.

(56) References Cited

U.S. PATENT DOCUMENTS

| | | | | |
|---|---|---|---|---|
| 5,826,169 | A  * | 10/1998 | Natarajan | 455/13.1 |
| 6,141,322 | A  * | 10/2000 | Poretsky | 370/231 |
| 6,693,887 | B2 * | 2/2004 | Stanwood et al. | 370/338 |
| 6,839,767 | B1 * | 1/2005 | Davies et al. | 709/232 |
| 6,993,040 | B2 * | 1/2006 | Davis | 370/412 |
| 7,333,438 | B1 * | 2/2008 | Rabie et al. | 370/242 |

(Continued)

FOREIGN PATENT DOCUMENTS

WO    2008111029 A2    9/2008

OTHER PUBLICATIONS

Olov Schelen et al.; "Resource Sharing in Advance Reservation Agents"; Journal of High Speed Networks, 10S Press, Amsterdam, NL, vol. 7, No. 3-4, Jan. 1, 1998, pp. 1-17 (213, XP-002959005), ISSN: 0926-6801.

*Primary Examiner* — Rasheed Gidado
(74) *Attorney, Agent, or Firm* — Bachman & LaPointe, P.C.

(57) ABSTRACT

A service admission control method in a communication network comprising at least one group of at least one node per group, the method comprising the steps: Receive a service establishment attempt from one group; and admit the service in the network depending on the granularity of the network topology, the link topology and/or the partitioning of the link topology.

8 Claims, 6 Drawing Sheets

(56) References Cited

U.S. PATENT DOCUMENTS

Figure 1:
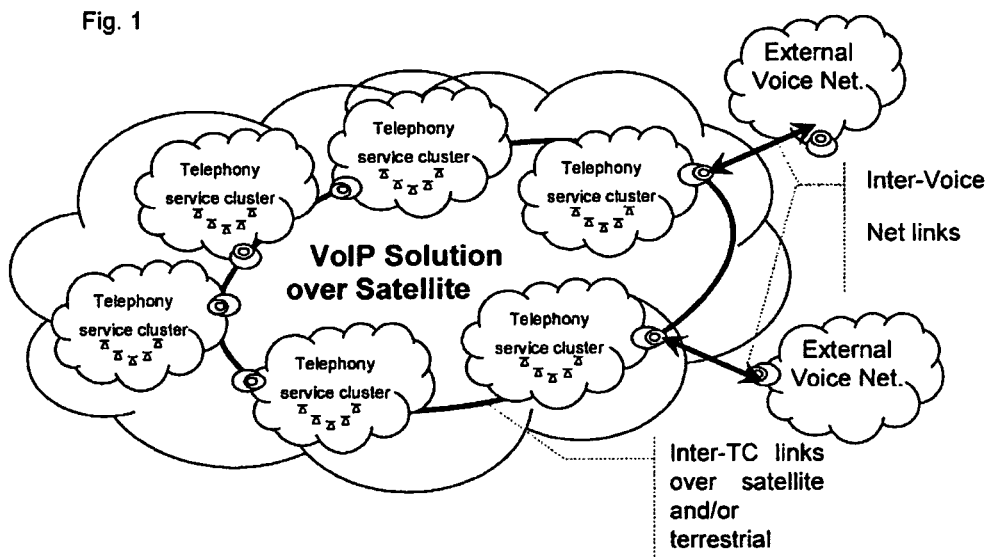

| | | | |
|---|---|---|---|
| 7,684,322 B2* | 3/2010 | Sand et al. | 370/230 |
| 7,983,158 B2* | 7/2011 | Guo et al. | 370/230 |
| 8,077,615 B2* | 12/2011 | Foti | 370/230.1 |
| 8,320,245 B2* | 11/2012 | Lange | 370/230 |
| 8,374,082 B2* | 2/2013 | Lange | 370/230 |
| 2006/0245356 A1* | 11/2006 | Porat et al. | 370/232 |
| 2007/0121503 A1 | 5/2007 | Guo et al. | |

* cited by examiner

SERVICE ADMISSION PATH CONTROL (SAPC)

FIELD OF THE INVENTION

The invention relates to an admission control method for controlling the admission of services in a communication network. Further the invention relates to an admission control device for controlling the admission of services in a communication network.

BACKGROUND OF THE INVENTION

Communication networks aim to provide integrated services such as voice, data, and multimedia via inexpensive low-powered mobile computing devices over wireless infrastructure. The demand for multimedia services over the air has been steadily increasing over the last few years. To support various integrated services with a certain quality of service (QoS) requirement in these networks, resource provisioning is a major issue.

PRIOR ART

A service admission mechanism exists for the VoIP (Voice over Internet Protocol) service. Call admission control (CAC) is such a provisioning strategy to limit the number of call connections and call dropping. A good CAC scheme has to balance the blocking and call dropping in order to provide the desired QoS requirements.

The CAC is Known in the Prior Art:

Due to the limited number of circuits, CAC is also implicitly used by the circuit-switched telephony world.

Further, within a packet-switched telephony, it is explicitly used to avoid some capacity overload such as: (1) The CAC mechanism can avoid overloading the CPU power of the server which embedded the call control software and this by limiting the number of calls processed by the Call-control machine (Softswitch, IP-PBX, . . . ). A CAC threshold is allocated per Call-control machine. (2) The CAC mechanism can be used to control the maximum number of calls established according to a right to use paid by the customer (usage licence). A CAC threshold is allocated per Call-control machine. (3) The CAC mechanism can limit the number of calls according to a terrestrial transmission cloud and its QoS policy applied between data services, voice services and video services. (4) A CAC threshold is allocated per transmission cloud. (5) The CAC mechanism can limit the number of calls established between predefined groups of VoIP subscribers. A CACin threshold and a CACout threshold (or a CACin/out) are allocated per groups of VoIP subscribers. (6) The CAC mechanism can limit the number of calls transited through a predefined path by an engineering process based on lower layer protocols such as RSVP.

The CAC mechanism has several disadvantages. Such existing mechanisms (CAC) of the application layer (Layer-7) do not pay attention (1) to the end to end physical link capacities (Layer-1), (2) to the physical topology of the involved links (point to point, point to multi-point or multi-point-to-multipoint), (3) to the end to end layer-2 topology, and (4) to the routing schema of the layer-3. Consequently, the existing mechanisms do not allow the control of the end-to-end QoS according to low layers topology and capabilities.

The invention described in the following considers and corrects such topics (1) to (4) in order to be able to control the end-to-end QoS at the application layer (Layer-7) and this without to constraint the low layers.

OBJECT OF THE INVENTION

It is an object of the invention to disclose an admission control method in a communication network which is capable to control the end-to-end QoS at the application layer (Layer-7) and this without to constraint the low layers.

This object is solved by the method according to claim 1.

Further advantageous embodiments of the inventions are given in the dependent claims, the description and the drawings.

SUMMARY OF THE INVENTION

A service admission control method in a communication network comprising at least one group of at least one node per group, the method comprising the steps:

(1) Receive a service establishment attempt from one group; (2) Admit the service in the network depending on the granularity of the network topology, the link topology and/or the partitioning of the link topology.

Additionally, the service admission control method wherein a service routing mechanism is added to the service admission mechanism.

Further, the service admission control method, wherein the service routing mechanism is aligned with the L-3 routing and the service routing mechanism is based on the shortest path algorithm based on cost per links.

Even further, the service admission control method, wherein a precedence and pre-emption mechanism is added to the service admission mechanism.

Additionally, the service admission control method, wherein the precedence and pre-emption mechanism allows the freeing of CBR bandwidth on the congested link(s) if a new service establishment attempt using this congested link(s) has a higher priority.

Further, the service admission control method, wherein the maximum number of hops between the communication endpoints is controlled.

Even further, the service admission control method, wherein the number of CBR streams previously admitted for each links of the node is controlled locally at each node in order to have a double check.

Additionally, the service admission control method, wherein each service taken into account is weighted according to the CBR bandwidth used per service stream.

The invention further discloses a service admission control device in a communication network, wherein service establishment attempts in the network are admitted depending on the granularity of the network topology, the link topology and/or the partitioning of the link topology.

Additionally, the service admission control device, wherein a service routing mechanism is added to the service admission mechanism.

Further, the service admission control device, wherein the service routing mechanism is aligned with the L-3 routing and the service routing mechanism is based on the shortest path algorithm based on cost per links.

Additionally, the service admission control device, wherein the precedence and pre-emption mechanism allows the freeing of CBR bandwidth on the congested link(s) if a new service establishment attempt using this congested link(s) has a higher priority.

Further, the service admission control device, wherein the maximum number of hops between the communication endpoints is controlled.

Even further, the service admission control device, wherein the number of CBR streams previously admitted for each links of the node is controlled locally at each node in order to have a double check.

Additionally, the service admission control device, wherein each service taken into account is weighted according to the CBR bandwidth used per service stream.

BRIEF DESCRIPTIONS OF THE DRAWINGS

Figure 2:
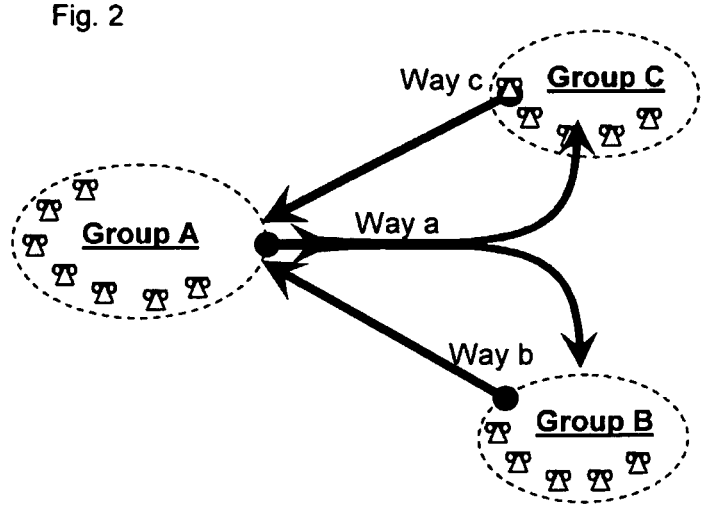
Figure 3:
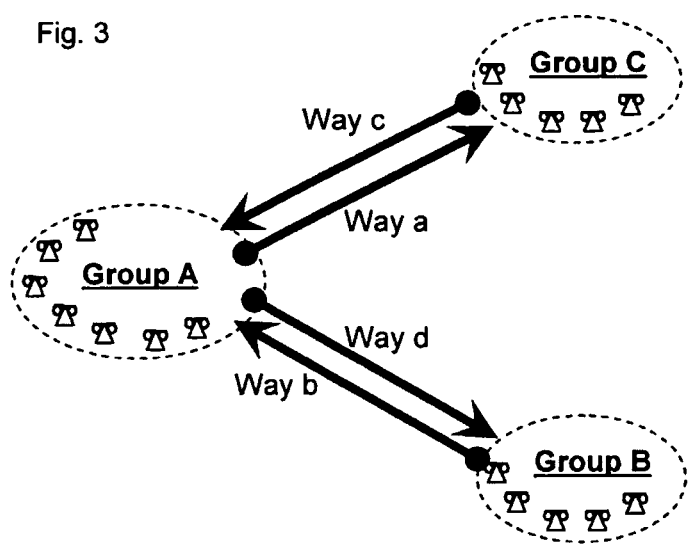
Figure 4:
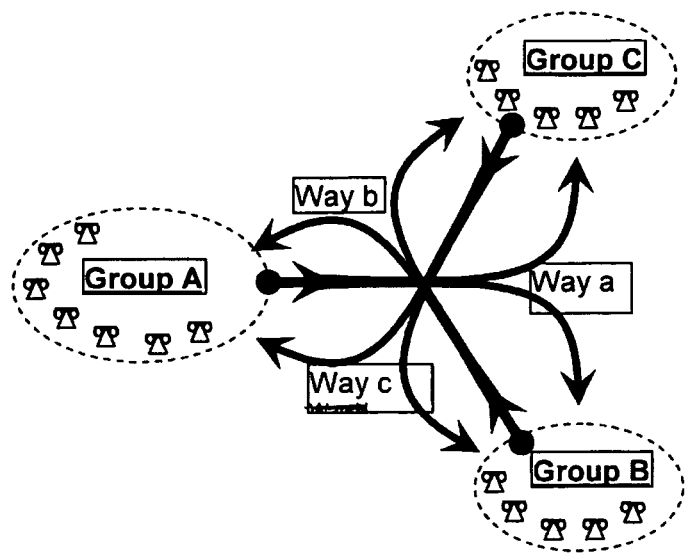
Figure 5:
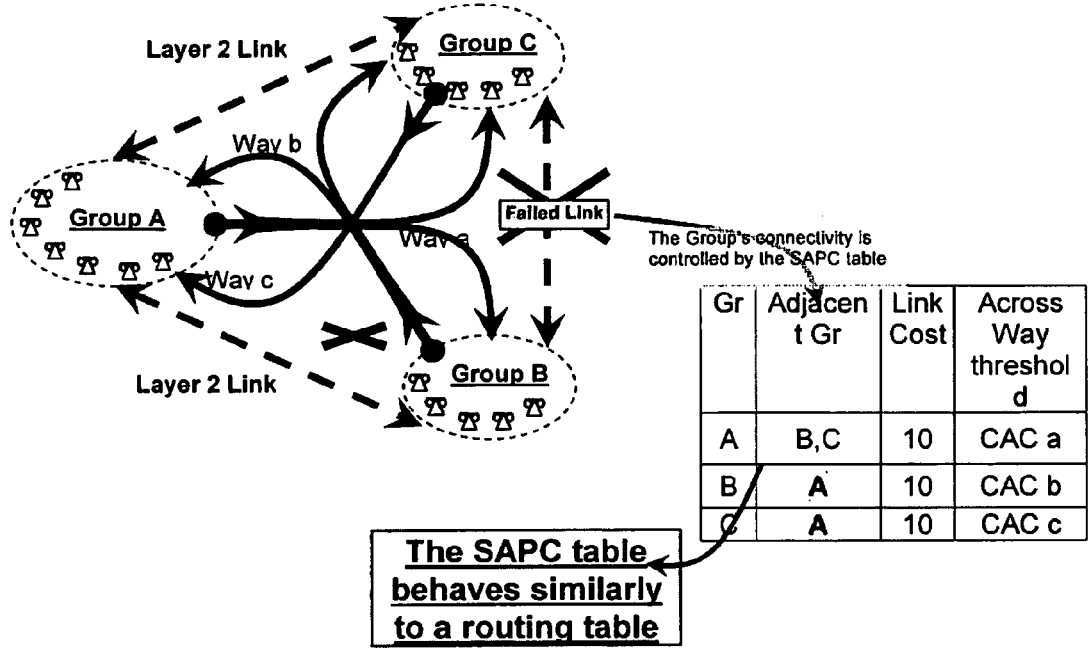

FIG. 1 shows an application of the invention for a VoIP service over a transmission cloud FIG. 2 shows a telephony cluster based on a star topology with 3 physical links, 2 Point-to-Point physical links and one Point-to-Multipoint physical link FIG. 3 shows a telephony cluster based on a star topology with 4 Point-to-Point physical links FIG. 4 shows a telephony cluster based on a meshed topology with 3 Point-to-Multipoint physical links FIG. 5 shows the case of a link failure based on a cluster with the same topology as for the FIG. 4

Figure 6:
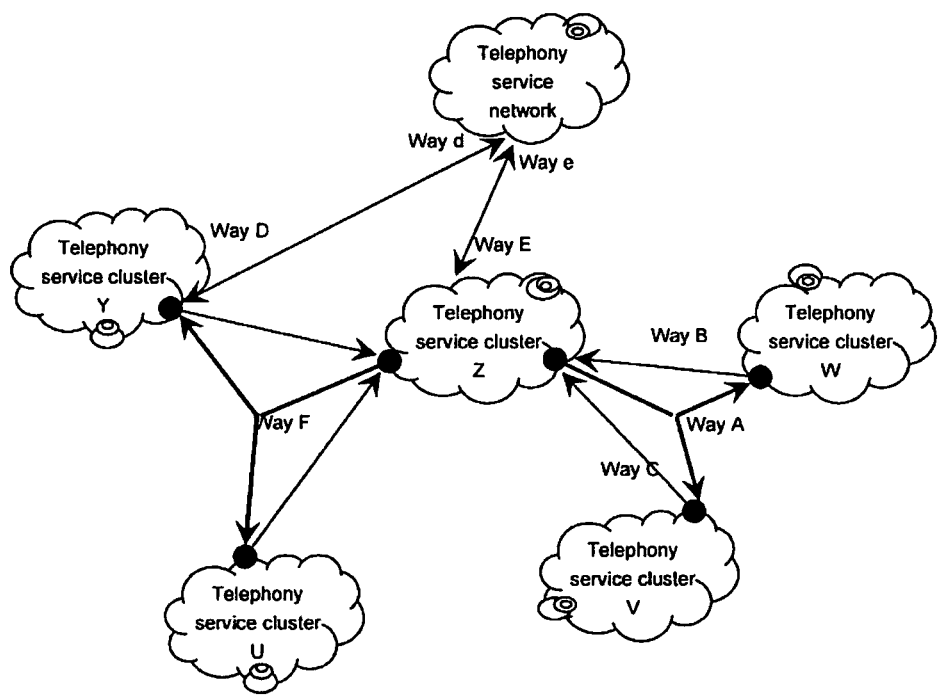

FIG. 6 shows an example telephony service inter-cluster links

DETAILED DESCRIPTION

Networks are a principal means of exchanging or transferring information (e.g., data, voice, text, video, etc.) among communication devices (e.g., devices for inputting and/or outputting information such as computer terminals, multimedia workstations, fax machines, printers, servers, telephones, videophones, etc.) connected to the networks.

In a network certain services (traffic plane), such as voice, video, video teleconferencing, circuit emulation and others, require transmission media which can provide a constant bit rate (CBR) class of service (guaranteed bandwidth). The CBR service class is designed for services that need a static amount of bandwidth that is continuously available for the duration of the active connection (this amount of bandwidth can be allocated on demand through a DAMA (Demand Assigned Multiple Access) engine or can be allocated by configuration or allocated through other means). The CBR COS (Class of Services) of a medium can be shared between several CBR services, including CBR services based on an activation detection mechanism such as VAD for Voice Activity Detection. In this description CBR services means a service which requires a CBR capacity of the network.

On a transmission medium CBR capacity is scarce. That means only a limited amount of CBR capacity, depending on the transmission medium used, is available and can be guaranteed. The CBR capacity is guaranteed through different techniques, e.g. QoS policies, reserved CBR bandwidth, etc. Therefore, free access of the CBR services to the available CBR capacity of a network would congest the network and consequently would decrease the performance of the CBR services. Note that, according to the invention, the CBR capacity can be shared among several transmission media (links) or can be allocated to only one transmission medium.

One possibility to guarantee the performance of the network is to control the CBR services by an admission control mechanism, i.e., by limiting the access of the CBR services to the available CBR capacity. Admission control is a key component for QoS delivery in IP networks because it determines the extent to which network resources are utilized and whether the contracted QoS requirements are actually delivered.

Important features of the invention are to control the real-time service admission according to (1) the granularity of the network topology, (2) the link topology and (3) the partitioning of the topology into clusters in order to control the congestion of each individual hop implied by each physical media path used between the communicating endpoints.

With other words, the real-time services over packet network, such as VoIP, Video, CESoE, . . . , should be admitted or not in a network topology according to its paths and their end-to-end available capacities in order to guarantee their good end-to-end conveying. Some of the main features are (1) before establishing the media streams over the network paths required by a real-time service, SAPC to control the performances (topology, bandwidth . . . ) of the network between the communicating endpoints; (2) to maintain the consistency between the SAPC mechanism and the performances of the network available at a time, and (3) to partition a (large) network into service clusters and to apply the SAPC mechanism according to this partitioning.

Between the communicating endpoints, one or several hops between network nodes (e.g. IP routers) can be used to convey the service traffic planes. Each hop can be physically made by two radio links or two wire links or two mixed radio-wire links (one physical link for each direction). Each physical link can congest independently from others according to their own capacity or due to the asymmetry of the service (such as video broadcast).

Therefore, before accepting a new service setup (e.g. a new call for a VoIP service) between two communicating endpoints, each involved physical link of the used path between the communicating endpoints must have the capacity to convey the required CBR service. If the CBR service setup is conveyed through a path where a physical link does not have enough capacity, all the CBR services conveyed by using this physical link would not work properly due to the congestion.

The disturbance due to such congestion point of a physical link will be propagated to all the CBR services using this congested physical link.

An important feature of the invention is that the SAPC mechanism is aligned with the lower level performances, topologies and partitions in order to keep the consistency between all layers and thus avoid the degradation of the CBR services in case of lower layers changes.

The physical links used for establishing the paths between communicating endpoints constitute the physical network topology. The logical links used for establishing the paths between communicating endpoints constitute the logical network topology. The network topology viewed by the application layer is made of logical links which are themselves made above the physical links. The network topology can changed according to the availability of the logical links and the physical links.

The bandwidth of a physical link can vary according to configuration decisions, according to the automatic adaptation to the environment, according to the jamming environment, according to the resource availability shared between several physical links or for any other reasons.

Such topology changes and physical link bandwidth variations impact the service layer. A CBR service could be admitted at a time according to a topology state and its associated physical links bandwidth. The same CBR services could not be admitted at another time due to such changes or variations.

This invention allows applying a QoS policy for the real-time services aligned with the real network topology and its transmission capacities/capabilities/availabilities and it allows keeping aligned this QoS policy with the network topology changes and performance changes.

The invention discloses also arbitrary combinations of the following embodiments.

The following embodiments are described mainly for telephony networks and telephony clusters. However, this is only an example. The invention is also applicable to other services over a packet networks, such as VoIP, Video, CESoE, . . . .

According to a first embodiment of the invention, the SAPC mechanism of the invention controls the real-time service admission according to the granularity of the network topology, the link topology and the partitioning of the link topology into clusters in order to control the congestion of each individual hop implied by each physical media path used between the communication endpoints.

A SAPC mechanism is dedicated to each telephony cluster. It controls the call admission of its cluster on its egress links with other telephony clusters or other external telephony networks.

FIG. 1 shows an application of the invention for a VoIP service over a transmission cloud. This transmission cloud is split in several voice clusters which are under control of one SAPC according to the invention. The partitioning into voice clusters is made consistent according to the lower layer partitioning (e.g. routing zone (OSPF (Open Shortest Path First) area), Users/location zone, . . . ). One SAPC per service cluster controls the telephony traffic with a granularity homogeneous of the service cluster topology. There is no hierarchy between clusters.

The solution is based on a decentralized "flat" architecture split into telephony clusters (TC). The advantages of this solution are (1) This service partitioning in telephony clusters (TC) is scalable and (2) this service partitioning allows decreasing the overall complexity and the traffic of a large network. According to the invention each service cluster is able to work in an autonomous manner from the others (resilient). Further, each service cluster is under the control of one and only one SAPC authority (It can be embedded in the Calls Control machine).

This approach does not exclude the usage of a distributed data base with a replication mechanism allowing each cluster to have the overall view of the network.

The term granularity is used to designate the smallest element of the network that has to be controlled by the admission mechanism (the SAPC). An element is typically a link between nodes (e.g. routers), i.e. the satellite carrier.

This invention discloses to control both the real-time service paths and the realtime services admission. This admission control mechanism becomes a Service Admission Path Control (SAPC) mechanism which has the knowledge of the cluster topology (and by extension of the overall network topology) and thus the knowledge of the real path between the communicating endpoints. The network topology knowledge of the SAPC mechanisms is maintained aligned (consistent) with the physical topology. The physical topology taken into account by the SAPC mechanism can be made of point-to-point physical links, point-to-multipoint physical links, multipoint-to-point and/or multipoint-to-multipoint physical links.

The SAPC of a cluster can be extended to another cluster in a redundancy purpose.

FIG. 2 shows an example of a telephony cluster based on a star topology with 3 physical links, 2 Point-to-Point links (way b and c) and one Point-to-Multipoint link (way a). Way a cannot be used for direct (one hop) communication between Group B and Group C.

The SAPC mechanism of this telephony cluster has the knowledge of each physical link of its cluster by using a service routing table. This service routing table provides the service capability of each link (i.e. the CAC threshold).

In case of a call attempt between two subscriber groups, the SAPC will first verify the involved CAC thresholds. If there is enough remaining capacity on the evolved links, it will accept the call attempt and decrease the CAC thresholds attached to the evolved links.

For example, in case of a call attempt between a subscriber of the group B and a subscriber of a group C:
  The voice stream from B to C (½ circuit "B→C") will be conveyed across the Way b and the Way a since B is adjacent to A and A is adjacent to C (B→A→C).
  The voice stream from C to B (½ circuit "C→B") will be conveyed across the Way c and the Way a since C is adjacent to A and A is adjacent to B (C→A→B).

The following summarized this: For a Call attempt between Group B and Group C, the SAPC
  T½ circuit "B→C": B is adjacent to A=>CAC b⁻⁻ ('b' counter is decreased by 1)
  A is adjacent to C=>CAC a⁻⁻
  ½ circuit "C→B": C is adjacent to A=>CAC c⁻⁻
  A is adjacent to B=>CAC a⁻⁻

The same star topology as above could be achieved through 4 links. Such a situation is shown in FIG. 3. FIG. 3 shows an example of a telephony cluster based on a star topology with 4 Point-to-Point physical links.

The SAPC mechanism of this telephony cluster has the knowledge of each physical link of its cluster by using a service routing table. This service routing table provides the service capability of each link (i.e. the CAC threshold). In case of a call attempt between a subscriber of the group B and a subscriber of the group C, the SAPC will decrease the CAC threshold as following:

For a Call attempt between Group B and Group C:
  The voice stream from B to C will be conveyed across Way b (CAC b threshold) and Way a (CAC a threshold)
  ½ circuit "B→C": B is adjacent to A=>CAC b⁻⁻
  A is adjacent to C=>CAC a⁻⁻
  The voice stream from C to B will be conveyed across Way c (CAC c threshold) and Way d (CAC d threshold)
  ½ circuit "C→B": C is adjacent to A=>CAC c⁻⁻
  A is adjacent to B=>CAC d⁻⁻

The SAPC mechanism allows the admission of a CBR service request or not according to the available capacity of each transmission mediums involved and per direction of the medium. Over a terrestrial transmission hop, this will allow to control the SLA by applying a service admission threshold for the both direction of the link or a service admission threshold per link. Over a radio (e.g. satellite) transmission carrier, this will allow the control of the SLA and/or will allow the limitation of the number of service establishments according to the radio carrier bandwidth at given time. Such radio carrier can be based on a point-to-point or a point-to-multipoint topology. A service admission threshold is associated per radio carrier whatever its medium topology is.

A transmission cloud between communication nodes can mixed radio mediums and terrestrial mediums. As example for a VoIP service, the VoIP using this transmission cloud can be under the control of one or several Call-control machines. The Call Admission Control (CAC) threshold/medium associations for a transmission cloud are consistent to the transmission topology. Inside the transmission topology, several voice paths between to communication nodes could be used over different mediums. I.e. the CAC thresholds that should be involved by a call attempt between two end points are related to the path used to convey the voice stream between these two end points. This creates a call routing principle related to the CAC.

Each telephony cluster is under the control of one SAPC mechanism. In case of an inter-cluster call attempt, before establishing the media path, each SAPC mechanism of each cluster will control its cluster capabilities and its egress capability which links it with its adjacent cluster (according to the shortest path). For example in case of a call attempt between U cluster and V cluster, U, Z and V SAPC mechanism of the related cluster will control its capabilities and U SAPC will control G Way, Z SAPC will control F way and A Way, and V cluster will control C Way.

FIG. 6 shows telephony service inter-cluster links. This physical links among the service clusters are also controlled by the SAPC mechanism according to the invention. A SAPC of a service cluster controls the egress links which allow connecting with another service cluster or an external network.

According to another embodiment of the Service Admission Path Control (SAPC) mechanism of the invention, a service routing mechanism is added to the service admission mechanism. This service routing control the admission of a service-request according to the real paths which will be used to convey the service streams. The SAPC mechanism has the topology knowledge through a "Service Routing Table".

The service routing table of the FIG. 2 is the following:

| Group | Adjacent Group | Link Cost | Across Way threshold |
|---|---|---|---|
| A | B, C | y | CAC a |
| B | A | w | CAC b |
| C | A | x | CAC c |

The service routing table of the FIG. 3 is the following:

| Group | Adjacent Group | Link Cost | Across Way threshold |
|---|---|---|---|
| A | C | y | CAC a |
| A | B | z | CAC d |
| B | A | w | CAC b |
| C | A | x | CAC c |

According to another embodiment of the Service Admission Path Control (SAPC) mechanism of the invention, this control principle is put under control to be "paths deterministic" between communication nodes. This control can be based on static routing rules, on cost path routing rules, on policy based routing rules on dynamic routing rules or other routing principles.

The routing table with link costs of the FIG. 4 is the following:

| Group | Adjacent Group | Link Cost | Across Way threshold |
|---|---|---|---|
| A | B, C | 10 | CAC a |
| B | A, C | 10 | CAC b |
| C | A, B | 10 | CAC c |

FIG. 4 shows a telephony cluster based on a meshed topology with 3 Point-to-Multipoint physical links.

In case of a call attempt between a subscriber of the group B and a subscriber of the group C, the SAPC will determine the shortest path according to the link costs and then will decrease the relevant CAC thresholds.

For a Call attempt between group B and group C:
The voice stream from B to C will be conveyed across Way b (CAC b threshold):
½ circuit "B→C": B is adjacent to C=>CAC b⁻
The voice stream from C to B will be conveyed across Way c (CAC c threshold):
½ circuit "C→B": C is adjacent to B=>CAC c⁻⁻

According to another embodiment of the Service Admission Path Control (SAPC) mechanism of the invention, the SAPC routing is aligned with the L-3 routing, where the SAPC routing principle is based on shortest path algorithm based on cost per links.

The group's connectivity is controlled by the following SAPC table (FIG. 5):

| Group | Adjacent Group | Link Cost | Across Way threshold |
|---|---|---|---|
| A | B, C | 10 | CAC a |
| B | A | 10 | CAC b |
| C | A | 10 | CAC c |

The SAPC table behaves similarly to a routing table.

FIG. 5 shows the case of a link failure. FIG. 5 shows the situation where receiver c of the Group B failed. In case of this link failure, the SAPC according to the invention is updated, either manually or automatically, according to the failure in a consistent manner (B and C are not anymore adjacent as a consequence of the link failure).

According to another embodiment of the Service Admission Path Control (SAPC) mechanism of the invention the maximum number of hops between the communication end-points is controlled.

According to the invention, one possibility of controlling the maximum number of hops between the communication end-points is the following: A hop counter is dedicated to each call attempt. It allows the control of the maximum hop number: each SAPC of each crossed cluster decreases the hop counter according to its link intra and inter-cluster topology. The hop counter is transmitted between the SAPC of each involved cluster via the telephony protocol. The call attempt is rejected by the SAPC where the hop counter reaches zero. This is a similar principle to the TTL field of an IP packet which is decreased by one per each crossed router.

According to the invention, one other possibility of controlling the number of hops between the end-points is the following: the SAPC of the outgoing cluster beforehand counts the number of hops to reach the called endpoint by using an overall view of network (Thanks to a distributed data base). According to another embodiment of the Service Admission Path Control (SAPC) mechanism of the invention, the number of CBR streams, previously admitted for each link of the node, can be controlled locally at each node in order to have a double check.

According to another embodiment of the Service Admission Path Control (SAPC) mechanism of the invention, each service taken into account by the mechanism is weighted according to the CBR bandwidth used per service stream.

According to another embodiment of the Service Admission Path Control (SAPC) mechanism of the invention, a priority and pre-emption mechanism is associated to the SAPC mechanism in order to previously force the release of lower priority call of each congested link involved by an upper priority call attempt. And thus in order to free the capacity used by the lower priority call and then to have free capacity that the upper priority call will use by the establishment of the media path.

This priority mechanism is associated to each SAPC mechanism and thus this precedence and pre-emption mechanisms allow controlling the pre-emption from end to end.

The embodiment described above can be arbitrarily combined. The invention also disclosed the arbitrary combinations of the embodiments above.

The invention claimed is:

1. A service admission control method in a communication network comprising a service cluster of groups of nodes, said groups being linked by physical links, the method comprising, at the application layer, the steps of:
   receiving a service establishment attempt from one node of one group, the service establishment attempt concerning a service between communicating endpoints of distinct groups;
   admitting the service in the communication network depending on a physical topology, of the physical links in order to control the congestion of each individual hop implied by each physical media path used between the communicating endpoints;
   performing, at the application layer, a service routing with a service routing table representing all physical links between the groups and associating each group with all other groups that are adjacent to said group via a same physical link, and with a call admission control threshold,
   wherein the service routing table is such that, for a point-to-multipoint physical link from a first group to adjacent second and third groups, said first group is associated with said adjacent second and third groups and with a unique call admission control threshold, and
   wherein the service routing is such that, for each call admission control threshold, said call admission control threshold is decremented when the service establishment attempt concerns a physical link between the group and one adjacent group which are associated with said call admission control threshold and when the call admission control threshold is high enough to admit the service.

2. The method of claim 1, wherein service pre-emption is performed by freeing a constant bit rate (CBR) bandwidth of lower priority service on each congested link(s) when a new service establishment attempt using said congested link(s) has a higher priority.

3. The method of claim 1, further comprising weighting each service taken into account according to a constant bit rate bandwidth used per service.

4. The method of claim 1, wherein the communication network is partitioned into a plurality of service clusters, said service clusters being linked by physical links, wherein the service is further admitted depending on the partitioning of the network into the service clusters,
   wherein the method further comprises:
      performing, at the application layer, the service routing with a service routing table representing all physical links between the service clusters and associating each service cluster with all other service clusters that are adjacent to said service cluster via a same physical link, and with a call admission control threshold,
      and wherein the service routing is such that, for each call admission control threshold, said call admission control threshold is decremented when the service establishment attempt concerns a physical link between the service cluster and one adjacent service cluster which are associated with said call admission control threshold.

5. A service admission control system operating at the application layer, the service admission control device configured in a communication network comprising a service cluster of groups of nodes, said groups being linked by physical links, wherein said service admission control system comprises:
   means for receiving a service establishment attempt from one node of one group, the service establishment attempt concerning a service between communicating endpoints of distinct groups;
   means for admitting the in the communication network depending on physical topology of the physical links in order to control the congestion of each individual hop implied by each physical media path used between the communicating endpoints;
   a service routing table representing all physical links between the groups and associating each group with all other groups that are adjacent to said group via a same physical link, and with a call admission control threshold;
   means for performing, at the application layer, a service routing with the service routing table, wherein the service routing table is such that, for a point-to-multipoint physical link from a first group to adjacent second and third groups, said first group is associated with said adjacent second and third groups and with a unique call admission control threshold, and wherein the service routing is such that, for each call admission control threshold, said call admission control threshold is decremented when the service establishment attempt concerns a physical link between the group and one adjacent group which are associated with said call admission control threshold and when the call admission control threshold is high enough to admit the service.

6. The system of claim 5, wherein said system comprises service pre-empting means adapted for freeing a constant bit rate bandwidth of lower priority service on congested link(s) when a new service establishment attempt using said congested link(s) has a higher priority.

7. The systems of claim 5, wherein said system comprises means for weighting each service taken into account according to a constant bit rate bandwidth used per service.

8. The system of claim 5, wherein the communication network is partitioned into a plurality of service clusters, said service clusters being linked by physical links, wherein the service is further admitted depending on the partitioning of the network into the service clusters,
   wherein the system further comprises:
      means for performing, at the application layer, the service routing with a service routing table representing all physical links between the service clusters and associating each service cluster with all other service clusters that are adjacent to said service cluster via a same physical link, and with a call admission control threshold,
      and wherein the service routing is such that, for each call admission control threshold, said call admission control threshold is decremented when the service establishment attempt concerns a physical link between the service cluster and one adjacent service cluster which are associated with said call admission control threshold.

* * * * *